US008643937B2

(12) United States Patent
Haspeslagh et al.

(10) Patent No.: US 8,643,937 B2
(45) Date of Patent: Feb. 4, 2014

(54) DIFFRACTIVE OPTICAL NANO-ELECTRO-MECHANICAL DEVICE WITH REDUCED DRIVING VOLTAGE

(75) Inventors: Luc Haspeslagh, Lubbeek-Linden (BE); Xavier Rottenberg, Kessel-lo (BE); Veronique Rochus, Liège (BE)

(73) Assignee: IMEC, Leuven (BE)

( * ) Notice: Subject to any disclaimer, the term of this patent is extended or adjusted under 35 U.S.C. 154(b) by 128 days.

(21) Appl. No.: 13/297,170

(22) Filed: Nov. 15, 2011

(65) Prior Publication Data
US 2012/0127558 A1  May 24, 2012

Related U.S. Application Data (60) Provisional application No. 61/414,355, filed on Nov. 16, 2010.

(51) Int. Cl.
*G02B 26/00* (2006.01)
*G02B 26/10* (2006.01)
*G02B 26/12* (2006.01)
*G02B 26/08* (2006.01)

(52) U.S. Cl.
USPC ............ 359/292; 359/224.1; 359/223.1; 359/200.6

(58) Field of Classification Search
CPC .......... G02B 26/0816; G02B 26/0833; G02B 26/0841
USPC ......... 345/84, 85; 359/9, 200.6, 223.1, 224.1, 359/291, 292, 298; 977/932
See application file for complete search history.

(56) References Cited

U.S. PATENT DOCUMENTS

| 6,583,031 | B2 * | 6/2003 | Lin ............................. 438/459 |
| 6,625,004 | B1 * | 9/2003 | Musolf et al. ................ 361/278 |
| 6,956,683 | B2 * | 10/2005 | Heaton et al. ............. 359/200.6 |
| 7,133,185 | B2 * | 11/2006 | Wen et al. ..................... 359/298 |
| 8,094,980 | B2 * | 1/2012 | Diamond et al. .............. 385/18 |
| 8,400,697 | B2 * | 3/2013 | Smith et al. ............... 359/198.1 |
| 2010/0014136 | A1 | 1/2010 | Haussler et al. |
| 2012/0127559 | A1 * | 5/2012 | Van Der Plas et al. ....... 359/291 |

FOREIGN PATENT DOCUMENTS

| EP | 2 453 289 A1 * | 5/2012 |
| JP | 2005-153057 | 6/2005 |
| JP | 2007-312553 | 11/2007 |
| JP | 2010-054628 | 3/2011 |

OTHER PUBLICATIONS

NPL_Full English Translation_Japanese Patent Application Publication P2010-054628A (Mar. 11, 2010).*
Extended European Search Report for European Patent Application No. 11189299.8-2217 dated Feb. 20, 2012.
Kim, et al., Mechanical Reliability of a Digital Micromirror With Interdigitated Cantilevers, Journal of Microelectromechanical Systems, vol. 19, No. 5, Oct. 2010, pp. 1197-1206.

* cited by examiner

*Primary Examiner* — David N Spector
(74) *Attorney, Agent, or Firm* — Knobbe, Martens, Olson & Bear LLP (57) ABSTRACT

A DND device is disclosed. In one aspect, the device includes a nano-mirror (21), and an actuating module configured to move the nano-mirror in an upward and/or downward position. The actuating module has a cantilever mounted to a fixed structure, and at least one first electrode for moving the cantilever in an upward and/or downward position. Such DND devices may be arranged in a 2D array.

15 Claims, 5 Drawing Sheets

DIFFRACTIVE OPTICAL NANO-ELECTRO-MECHANICAL DEVICE WITH REDUCED DRIVING VOLTAGE

CROSS REFERENCE TO RELATED APPLICATIONS

This application claims priority under 35 U.S.C. §119(e) to U.S. provisional patent application 61/414,355 filed on Nov. 16, 2010, which application is hereby incorporated by reference in its entirety.

FIELD OF THE INVENTION

The disclosed technology relates to diffractive optical nano-electro-mechanical devices for modulating light waves, and to holographic projection systems comprising such movable nano-electromechanical devices.

DESCRIPTION OF THE RELATED TECHNOLOGY

Holographic projection systems containing an array of individually controllable electromechanically movable micro-mirrors, i.e. a so-called micro-electro-mechanical system (MEMS), for modulating a light wave front are known. When illuminated by visible light capable of generating diffraction and interference, and coded with sequences of video holograms, the array of micro-mirrors can holographically reconstruct the optical appearance of the coded three-dimensional scenes. Light waves diffracted at one micro-mirror will spread out in all directions and interfere with light waves diffracted at other micro-mirrors. Such systems use a holographic video device in real time or at least near real time. Because in the micro-mechanical system the electronic controllers and the modulator cells are integrated on one chip, the diagonal of the active surface area of the light modulator generally measures up to a few centimeters only. The real time requirement puts stringent demands on the resolution and speed of the light modulator in order to be able to realize holographic reconstructions with high resolution, brightness and contrast while keeping spatial and temporal cross talk within acceptable limits. Preferably the projection systems must be able to present the three-dimensional scene to one or more observers at a sufficiently large viewing angle.

Holography is based on diffraction of a reference monochromatic coherent light beam such as a laser on a holographic plate, which is here the 2D array of movable micro-mirrors, and the resulting interference of the light waves diffracted at this holographic plate. This interference recreates the original light field, i.e. the 3D scene. Projection angles are inversely proportional to the pitch P of the micro-mirrors in the 2D array. The projection angle is the range of angles at which a viewer looking to the 3D scene still experiences the holographic view. A projection angle of 60° requires a pitch of one wavelength ($1\lambda$) of the used laser light ($\lambda_{RED}$=650 nm, $\lambda_{GREEN}$=510 nm, $\lambda_{BLUE}$=475 nm). So an average micro-mirror pitch for a 60° projection or viewing angle system is approximately 500 nm. Similarly, a $2\lambda$ pitch corresponds to a 30° system, or a $0.5\lambda$ pitch corresponds to a 120° system, etc.

The diffractive efficiency of such a 2D micro-mirror array is dependent on a so-called modulation depth, i.e. a vertical displacement of individual micro-mirrors. Typically a vertical displacement z of $\lambda/4$ is favorable. This means that for optical wavelengths a micro-mirror will have to achieve a total displacement in the range of 100-200 nm. A binary operation is sufficient for binary hologram encoding, where an upper position represents a logical "0" state, while a lower position represents a logical "1" state.

The main element of such holographic 3D visualization/projection system is an electro-mechanical integrated system which modulates the incoming optical light. This system comprises a two-dimensional (2D) array of closely packed diffractive optical electro-mechanical devices as micro-mirrors and their corresponding driver electronics for individually operating each DND. US 2010/0014136 discloses an overview of such devices.

Figure 1:
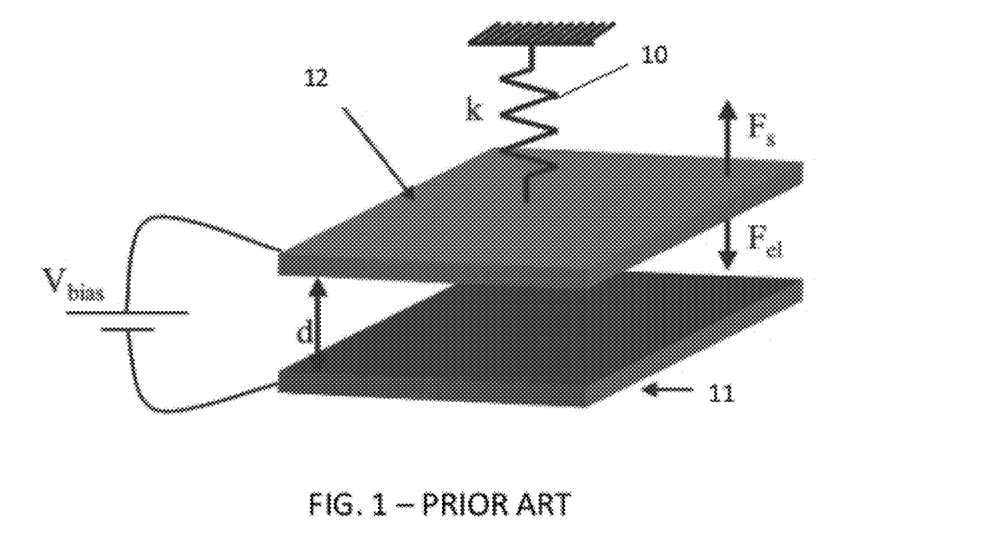
FIG. 1 is a schematic illustration of a prior art bi-stable electrostatic actuation of a micro-mirror device. Each device actuator comprises a mechanical spring structure (top), a movable electrode (middle) connected to the mirror and a fixed electrode (bottom).

Conceptually a micro-mirror device comprises a movable optically reflective mirror (not illustrated for clarity of other parts), a mechanical spring 10 connected to the mirror and at least one electrode, for example two electrodes 11, 12, for actuation of the movable mirror. These electrodes 11, 12 are located underneath the mirror so as not to block the incoming light wave. One electrode 11 is fixed while the other electrode 12 may be connected to the mirror. The spring 10 and the electrodes 11, 12 are shown in FIG. 1. The spring 12 will maintain the mirror in a first fixed position, in the embodiment illustrated the upper position. When a voltage is applied to the at least one electrode, e.g. between the electrodes 11, 12, a force $F_{el}$ is exerted on the mirror, which will move towards the lower electrode 11, against the force $F_s$ exerted by the spring 10. Once a so-called "pull-in" voltage is applied to the at least one electrode, e.g. between the electrodes 11, 12, the system becomes unstable and the attracted part, e.g. the upper plate 12, collapses onto the lower plate 11 bringing the mirror in a second stable position, here the lower position. The interaction between the at least one electrode, e.g. the two electrodes 11, 12, and the spring 10 creates a bistable actuation mechanism. The distance over which the mirror may be moved in vertical direction z under the influence of the electrical field is called the lift. An upper "0" state is here achieved by the built-in mechanical strength of the spring. A lower "1" state is here achieved by applying the "pull-in" voltage between the upper and lower terminals. Based on elementary physics of electrostatic actuation, the following dependence is observed for the required "pull-in" voltage ($V_{PI}$):

$$V_{PI} = \alpha (d^3/S)^{1/2} \qquad \text{(Eq. 1)}$$

where d is the initial gap between the upper and lower attracted parts, e.g. electrodes 11, 12, and S is the active area of the attracted parts, e.g. electrodes 11, 12, i.e. the areas between which the electrical field is established.

In order to obtain high resolution holographic projection systems, nano-electro-mechanical devices (DNDs) are used as micro-mirrors. A typical DND is a 500 nm×500 nm sized device with a vertical (mechanical) displacement of 125 nm. Further scaling the device in its x-y (horizontal) dimensions is favorable as this would achieve higher projection angles thanks to the decreasing pitch. However, scaling of the vertical displacement or lift along the z-axis is not desired as a reduced lift would decrease the overall diffractive efficiency of the system. This constraint renders any practical realization of such a DND-based system extremely difficult, as very high voltages (tens to hundreds of volts) would be required to actuate the individual DNDs, in view of their limited surface area. Such high voltages do not fit with typical CMOS driving architectures.

SUMMARY OF CERTAIN INVENTIVE ASPECTS

Certain inventive aspects relate to DND device. In one aspect, the DND devices can be used to build a 2D array of DND devices, which can be used to provide a DND-based holographic projection system.

In a first aspect, there is a DND device comprising a nano-mirror, and an actuating mechanism for moving the nano-mirror in an upward and/or downward position. In accordance with certain embodiments, the actuating mechanism comprises a cantilever mounted to a fixed structure and at least one first electrode for moving the cantilever in an upward and/or downward position. The nano-mirror is mounted either directly on the cantilever or mounted on the cantilever via a spacer mounted at a free longitudinal extremity of the cantilever. The material of the cantilever could be either a flexible or a rigid material. The cantilever is mounted to the fixed structure either in a fixed way or in a pivotal way so as to permit pivoting of the cantilever around the fixed structure. In accordance with certain embodiments, the nano-mirror is located substantially outside, e.g. completely outside, the actuation area. The actuation area comprises the at least one first electrode, and optionally other electrodes, for moving the nano-mirror. This means that in accordance with certain embodiments, the actuation mechanism does not need to fit underneath the nano-mirror.

In one aspect, the cantilever comprises at least a first and a second cantilever segment, wherein the second cantilever segment is actuated by the at least a first electrode. As an additional advantage, the surface area of the electrode to actuate the cantilever can be reduced by actuating only a portion of the cantilever and thereby reducing chip area.

In one aspect the surface area of the second cantilever segment is larger than the surface area of the first cantilever segment. The surface area of the second cantilever segment is related to the impact of the at least one first electrode on the cantilever. As an additional advantage, an increased surface area will increase the impact of the electrodes on the cantilever resulting in a lower voltage requirement to pull-up or pull-down the cantilever.

In one aspect, the cantilever further comprises a third and a fourth cantilever segment, the third cantilever segment connecting the second cantilever segment to the fourth cantilever segment and wherein the third cantilever segment is pivotally mounted to the fixed structure. The fixed structure can comprise a torsional element for easy pivoting of the cantilever around the fixed structure. The fourth cantilever segment can be used as a counterweight for the first and second cantilever segments. As a consequence it is possible to drive the DND device with lower voltages than prior art actuation voltages. It is hence an advantage of a DND device according to one embodiment that it considerably reduces the driving voltages required for actuating the nano-mirror over the desired lift, compared to prior art solutions.

In one aspect, the DND device further comprises at least one second electrode for actuating the fourth cantilever segment. The at least one first electrode can be used for pull-down/pull-up of the mirror, while the at least a second electrode can be used for pull-up/pull-down of the mirror. This allows actuation of the cantilever in clockwise and in counter-clock wise direction, depending on which of the electrodes are actuated. This embodiment allows reducing the required actuation voltages even more.

In one aspect, the second and the fourth cantilever segments are electrodes. Employing a voltage on the electrodes allows the use of lower voltages with the at least one first and one second electrodes. As an additional advantage, the voltage levels on the pull-up and pull-down electrodes can be lowered further by putting the second and fourth cantilever segment at a voltage potential.

In one aspect, the electrodes are electrically connected to each another. As an additional advantage, only one electrode needs to be connected to a voltage course to put both electrodes on a predetermined voltage potential. This allows three-terminal actuation, hence less routing of actuation signals is required.

In one aspect, the first cantilever segment furthermore comprises a flexure element which allows bending of the first cantilever segment in order to put the nano-mirror in a horizontal position when being actuated downwards. As an additional advantage, the flexure element ensures that the nano-mirror is in a horizontal position when pulled down by the electrodes. The flexure element bends when the cantilever and nano-mirror is pulled down by the electrodes. As a consequence, the nano-mirror is not tilted with a predetermined angle and is in a horizontal position when pulled downwards.

The second and fourth cantilever segments may be referred to as "common terminals", "top electrodes", "top terminals" or "common electrodes".

Initially, when in rest, a voltage difference is created between the common terminals and the first and second electrodes to hold the nano-mirror in one of both positions (up or down). This voltage difference is higher than the pull-out voltage but less than the pull-in voltage.

When the nano-mirror is to be rotated to the other of both positions, the cantilever is first rotated to an intermediate position by first increasing only the voltage difference between the common terminals and the at least one first and at least one second electrodes associated with this other of both positions to the pull-in voltage and then reducing the voltage difference between the common terminals and the one of the at least one first and at least one second electrodes associated with this initial position to below the pull-out voltage.

The cantilever is then further rotated to the other of both positions by creating a voltage difference between the common terminals and the at least one first and at least one second electrodes associated with this other of both positions to the pull-in voltage again.

In one aspect, an imaging system comprising a plurality of DND devices arranged as to form an array of nano-mirrors is presented.

DND devices according to one aspect can be configured in a 2D array comprising at least two rows of DND devices, whereby at least one row comprises an alternating sequence of common electrodes and cantilevers. This allows a closely packed 2D array of DND devices with nano-mirrors whereby all nano-mirrors can be arranged in a compact and neat array of nano-mirrors; reducing the distance between each nano-mirror. Not all actuation elements need to fit underneath the nano-mirrors, hence allowing larger actuation forces at lower actuation voltages.

Particular and preferred aspects of the invention are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF CERTAIN ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

In one embodiment, DND relates to a digital nano-mirror device. A DND chip has on its surface several hundred thousands of DND elements, which are microscopic mirrors of nanometer dimensions (e.g. not larger than 1 µm in length and width, such as between 400 and 800 nm across), arranged in an array. Each mirror corresponds to a pixel in an image to be displayed. The nano-mirrors can be individually moved, e.g. rotated, to an on or an off state. In the on state, light from a light source is reflected into a lens making the pixel appear bright on a projection surface. In the off state, the light is directed elsewhere (usually onto a heat sink), making the pixel appear dark.

In one embodiment, the DND elements, e.g. nano-mirrors, are made out of optically reflective material, such as for example aluminum. The DND elements, e.g. nano-mirrors, are provided with a mechanical spring allowing them to move. At least one electrode is provided for actuating each DND element. The electrodes are biased via corresponding driver circuits.

With "light" in the context of the present description is meant electromagnetic radiation with a wavelength between about 390 and 750 nm, for example between 420 and 650 nm, i.e. visible light.

In a first aspect, there is a DND device 20 comprising a nano-mirror 21, and an actuating mechanism for moving the nano-mirror 21 in an upward and/or downward position. In accordance with one embodiment, the actuating mechanism comprises a cantilever 32 mounted to a fixed structure 26, and at least one first electrode 23, 29 for moving the cantilever 32 in an upward and/or downward position.

The nanomirror 21 can be attached directly to the cantilever 32 or can be attached to the cantilever via a spacer element 31, for example provided at a first longitudinal extremity 27 of the cantilever 32. The first longitudinal extremity 27 is the free standing extremity of the cantilever 32. The cantilever 32 can be mounted at its second longitudinal extremity, which is the supported extremity, to a fixed structure 26, either in a fixed way or via a torsional element 25. A torsional element 25 is an element which can undergo a torsion when the cantilever 32 is actuated for movement.

In one embodiment, the nanomirror 21 is located on the cantilever 32 such that it does substantially not cover the first electrode 23. Alternatively worded, it can be that the at least one first electrode 23 is physically located substantially outside the mirror area, e.g. completely outside the mirror area. The mirror area is defined at the area covered by a perpendicular projection of the nanomirror 21 on the substrate. If the first electrode 23 is physically located substantially outside de mirror area, this means that the first electrode 23 has a perpendicular projection onto the substrate which does not substantially overlap with the perpendicular projection of the nanomirror 21 on the substrate, e.g. less than 10%, such as less than 5%, even less than 1%. In particularly advantageous embodiments there is no overlap between the perpendicular projection of the nanomirror 21 on the substrate and the perpendicular projection of the first electrode 23 on the substrate.

In one embodiment, the cantilever 32 comprises at least a first cantilever segment 24 and a second cantilever segment 22, wherein the second cantilever segment 22 may be actuated by the at least a first electrode 23. In particular embodiments, the first and second cantilever segments 24, 22 can be constructed from a different materials so as to limit electrical conduction between these segments. In alternative embodiments, the complete cantilever 32 may be made from one and the same material.

In one embodiment the surface area of the second cantilever segment 22 is larger than the surface area of the first cantilever segment 24. In one embodiment, the surface of the second cantilever segment 22 substantially corresponds to the surface of a corresponding first electrode 23. With "corresponding first electrode 23" is meant that electrode which, in use, will be involved in the actuation of the cantilever 32.

In one embodiment, the cantilever 32 further comprises a third and a fourth cantilever segment 28, 30; the third cantilever segment 28 connecting the second cantilever segment 22 to the fourth cantilever segment 30. The third cantilever segment 28 may be pivotally mounted to the fixed structure 26 via a torsional element 25.

In one embodiment, the DND device 20 further comprises at least one further electrode 29 for actuating the fourth cantilever segment 30.

The second and fourth cantilever segments 22, 30 may be referred to as "electrodes", "common terminals", "top electrodes", "top terminals" or "common electrodes" throughout the text. All terms are intended to mean the same, and can be used interchangeably for one another. These second and fourth cantilever segments can be used as movable electrodes while electrodes 23 and 29 are fixed electrodes.

A DND device according to one embodiment has an architecture that considerably reduces the driving voltages required for actuating the nano-mirror over a desired lift of $\lambda/4$. Consequently the power requirements of a holographic projection system comprising an array of such DND devices are reduced while maintaining the desired diffraction efficiency.

A DND device according to one embodiment allows for further scaling of the x-y dimensions of the reflective surface of the DND, i.e. of the dimensions in the plane of the reflective surface, while offering a lift of the nano-mirror capable of providing a desired diffraction efficiency even at reduced actuation voltages. This lift may be in the range of $\lambda/4$, preferably in the range of 100 nm to 200 nm for visible light. Smaller displacements could be used at the expense of a linearly decreasing diffractive efficiency. Moreover, a holographic system comprising such an array of DNDs can offer a projection view of more than 50°, even 60° or more. This DND device allows a close packing of the DND in a 2D array.

DND Architecture

In one embodiment, the nano-mirror 21 of a DND device 20 may be positioned outside the area where the electrodes 22, 23 are located. This is different from the electrostatic actuation scheme, shown in FIG. 1, as well as from other existing micro-mirror architectures, where the micro-mirror is positioned above the electrodes 11, 12 controlling the movement of the micro-mirror. It is advantageous, when scaling down the micro-mirrors to nano-mirrors, not to fit all actuation components 22, 23 and optionally 29, 30 underneath the mirror 21, as the extremely small pixel (mirror) dimensions, e.g. about 0.5 µm×0.5 µm, on the one hand make it very difficult to actually manufacture the actuation components 22, 23 and optionally 29, 30 underneath the nano-mirror 21, and on the other hand only provide a limited area for exerting force. Hence the pulling force on the nano-mirrors 21 when the actuation components would be fit underneath these mirrors would be too small. This could be solved by providing higher voltages, but this is not what is desired, as this does not fit with standard CMOS driving architecture components.

In one embodiment of the DND devices 20, the movable nano-mirror 21 is attached to a first cantilever segment 24 of a pivotable cantilever 32. The cantilever 32 can rotate thanks to at least one torsional element 25 which mechanically connects, via a fixed structure 26, the cantilever 32 to a substrate (not explicitly illustrated in FIG. 2). In one embodiment, the term "substrate" may include any underlying material or materials that may be used, or upon which a cantilever may be formed. In particular embodiments, this "substrate" may include a semiconductor substrate such as e.g. doped or undoped silicon (Si), a gallium arsenide (GaAs), a gallium arsenide phosphide (GaAsP), an indium phosphide (InP), a germanium (Ge), or a silicon germanium (SiGe) substrate. The "substrate" may include for example, an insulating layer such as for example a $SiO_2$ or a $Si_3N_4$ layer in addition to a semiconductor substrate portion. Thus, the term substrate also includes silicon-on-glass, silicon-on sapphire substrates. The term "substrate" is thus used to define generally the elements for layers that underlie a layer or portions of interest.

An actuating, movable electrode 22 is attached to or forms part of this cantilever 32, while at least one actuating, fixed, electrode 23 is positioned underneath the cantilever 32 on the substrate supporting the at least one torsional element 25. The movable and fixed electrodes 22, 23 may be made from any suitable electrically conductive material, such as metals, for example Aluminum, or highly doped semiconductor material, such as for example Si, polysilicon, SiGe.

In the embodiment illustrated, the top electrode 22 is formed by a part of the cantilever 32 having a larger x-y area and is in the plane of the cantilever 32. In alternative embodiments, the top electrode 22 can also be attached to a bottom surface of the cantilever 32, i.e. the surface of the cantilever 32 facing the supporting substrate. In yet alternative embodiments, the top electrode 22 can also be attached to the top surface of the cantilever 32, i.e. at the surface of the cantilever 32 facing away from the supporting substrate. The position of the top electrode 22 on the cantilever 32 (same plane, below or above) determines the distance between the movable top electrode 22 and the fixed bottom electrode 23. This distance and the size of the electrodes influence the magnitude of the voltages required to actuate the cantilever 32.

The cantilever 32 may rotate under influence of an electrical field created between both the moving and fixed electrodes 22, 23. The torsional elements 25 will act as a pivot, thereby allowing the cantilever 32 to rotate around the at least one torsional element 25. In one embodiment, the first cantilever segment 24 of the cantilever 32 to which the nano-mirror 21 is attached is located outside the area where the actuating electrodes 22, 23 are positioned. Hence, the cantilever 32 extends outside this electrode or actuation area, thus allowing the nano-mirror 21 to be remote from the electrodes 22, 23 along the longitudinal axis of the DND device, as illustrated for example in FIG. 2 and FIG. 3. Thanks to the distance along the cantilever 32 between the nano-mirror 21 and the electrostatic actuator formed by at least the electrodes 22, 23, the vertical displacement of the movable electrode 22 during actuation of the DND is smaller than the vertical displacement or lift of the nano-mirror 21.

Figure 2:
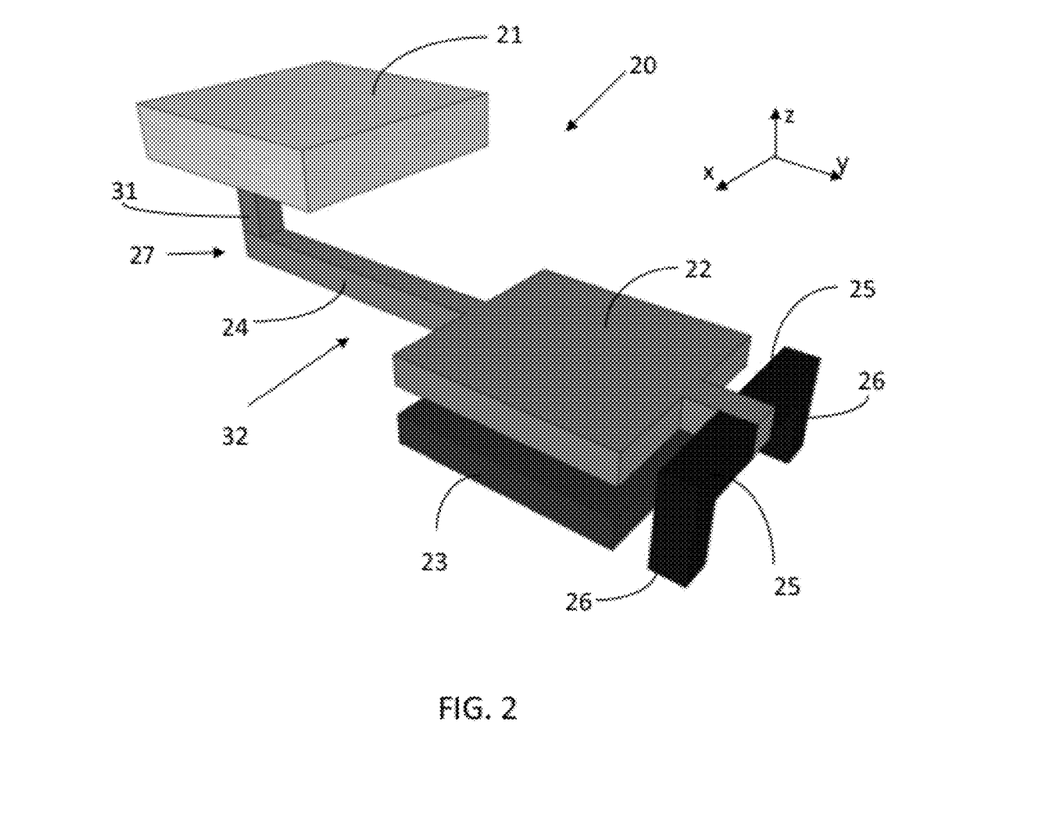
FIG. 2 is a schematic illustration of a 2-terminal DND according to one embodiment.
Figure 3:
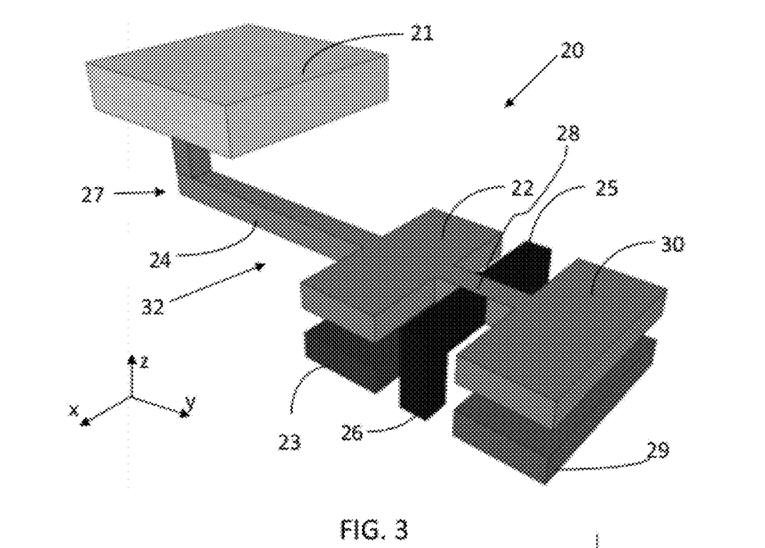
FIG. 3 is a schematic illustration of a 3-terminal DND according to one embodiment.

FIG. 2 and FIG. 3 illustrate two different embodiments of a DND device 20 according to one embodiment.

The DND device 20 of the embodiment illustrated in FIG. 2 can use a 2-terminal actuation, similar to the mechanism described in the prior art situation of FIG. 1. The "pull-down" motion is accomplished by applying a voltage, which is higher than the "pull-in" voltage, between the movable top electrode 22 and the fixed pull-down electrode 23. The "pull-up" motion in this embodiment is achieved using the built-in mechanical forces of the torsional elements 25 or the mechanical strength/flexibility of the material of the cantilever 32. In the embodiment illustrated in FIG. 2, the mirror 21 is attached to the first cantilever segment 24 of the cantilever 32. The torsional elements 25 are located at the second cantilever segment 22 of the cantilever 32. The electrodes 22, 23 are positioned in between the mirror 21 and the pivot formed by the torsional elements 25. In the embodiment illustrated, the top electrode 22 is formed by a part of the cantilever 32 having a larger x-y area and is in the plane of the cantilever 32. In alternative embodiments, the top electrode 22 can also be attached to a bottom surface of the cantilever 32, i.e. the surface of the cantilever 32 facing the supporting substrate. In yet alternative embodiments, the top electrode 22 can also be attached to the top surface of the cantilever 32, i.e. at the surface of the cantilever 32 facing away from the supporting substrate. The position of the top electrode 22 on the cantilever 32 (same plane, below or above) determines the distance between the movable top electrode 22 and the fixed bottom electrode 23. This distance and the size of the electrodes influence the magnitude of the voltages required to actuate the cantilever 32.

This design can be further optimized using 3-terminal or 4-terminal actuation, as illustrated in FIG. 3. In the embodiment illustrated in FIG. 3, the mirror 21 is again provided at a first cantilever segment 24 of the cantilever 32. Here the electrode 23 is positioned at the second cantilever segment 22 of the cantilever 32. The second cantilever segment 22 can hereby be used as a first top electrode. In this 3-terminal DND device a further fixed electrode 29 is present underneath the fourth cantilever segment 30 or an extension thereof on the substrate supporting the torsional elements 25. The fourth cantilever segment 30 can hereby be used as a second top electrode. The torsional elements 25 may be attached to the longitudinal sides of the cantilever 32, at a position in between both fixed electrodes 23, 29. This position of the pivot allows the cantilever 32 to turn clockwise or counter clockwise under influence of an electrical field present between the top electrodes 22, 30 and one of the fixed electrodes 23, 29.

If the second and fourth cantilever segments 22, 30 are not used as electrodes, the influence of an electrical field present between one of the fixed electrodes 23, 29 and the second and fourth cantilever segments 22, 30 will allow the cantilever 32 to move, i.e. to turn clockwise or counter clockwise.

In one embodiment, the fourth cantilever segment 30 can act as a counterweight for the cantilever 32 whereby only electrode 23 is actuating the cantilever 32. This can limit voltage levels needed for the electrode to actuate the cantilever 32.

In a 3-terminal actuation scheme, the top terminals 22, 30 may serve as a common terminal for "pull-up" as well as for "pull-down" actuation. The "pull-up", respectively "pull-down" motion is accomplished by applying a voltage between the fixed "pull-up", respectively "pull-down" electrode 29, 23 and the common electrode 22, 30. An advantage of such a 3T DND actuation is that a bi-stable actuation mechanism is obtained by actively performing both "pull-up" and "pull-down" motions using the corresponding electrode pairs 22, 23 and 30, 29. This bi-stable actuation mechanism is not dependent on the mechanical force of the spring. The torsional elements 25 can thus be modified, e.g. made more flexible by weakening or softening their stiffness and/or spring constant. These torsional elements 25 are not used for actuation of the mirror 21, but serve purely as a support carrying the common electrode 22, 30, the cantilever 32 and the mirror 21. Compared to the 2-terminal actuation cited above, this reduction in torsional stiffness of the torsional elements 25 enables further reduction of the required actuation voltages. Furthermore, the active actuation in both directions (clockwise and counter clockwise) considerably shortens the necessary set-up time, especially so in case of the "pull-up" motion. Another advantage of this 3T design is that the dual electrode also helps to release the structure if the contact forces are too large. This increases the reliability of such a device.

In the embodiment illustrated in FIG. 3, the further fixed pull-up electrode 29 is illustrated. This pull-up electrode 29 is provided on the substrate, at the other side of the fixed structure 26 of the at least one torsional element 25 compared to the first fixed pull-down electrode 23. Above the further fixed electrode 29, and forming part of the cantilever 32, a further movable electrode 30 is provided. When actuated, i.e. when a suitable voltage, i.e. a voltage larger than the pull-in voltage, is applied between the further fixed electrode 29 and the further movable electrode 30, the further movable electrode 30 is moved towards and onto the further fixed electrode 29, thus providing a pull-up motion of the nano-mirror 21.

Again, as in the two-terminal embodiment, the further movable top electrode 30 may be formed by a part of the cantilever 32, having a larger x-y area. In this case, the further movable top electrode 30 may be in the plane of the cantilever 32. In alternative embodiments, the further movable top electrode 30 can also be attached to a bottom surface of the cantilever 32, i.e. the surface of the cantilever 32 or an extension thereof facing the supporting substrate. In yet alternative embodiments, the further movable top electrode 30 can also be attached to the top surface of the cantilever 32 or an extension thereof, i.e. at the surface of the cantilever 32 or an extension thereof facing away from the supporting substrate. The position of the further movable top electrode 30 on the cantilever 32 (same plane, below or above) determines the distance between this further movable top electrode 30 and the further fixed bottom electrode 29. This distance and the size of both these electrodes influence the magnitude of the voltages required to actuate the cantilever 32 in its upward movement.

In the embodiment illustrated in FIG. 3, the further movable top electrode 30 is provided in the plane of the cantilever 29, and is formed by part thereof, extending beyond the third cantilever segment 28 where the cantilever 32 is attached to the one or more torsional elements 25. The further movable top electrode 30 has an area larger than the corresponding area of the extension of the cantilever 32.

In the embodiment illustrated in FIG. 3, the top electrodes 22 and 30 for pull-down and pull-up motion, respectively, are also called "common electrode" as they are common to the pull-up and pull-down electrodes. In alternative embodiments, electrically separate top electrodes could be provided. In particular for example when top electrodes 22, 30 are provided at a bottom or top surface of the cantilever 29, they may be made from material which is different from the cantilever material, and they may easily be electrically insulated from one another.

Figure 6:
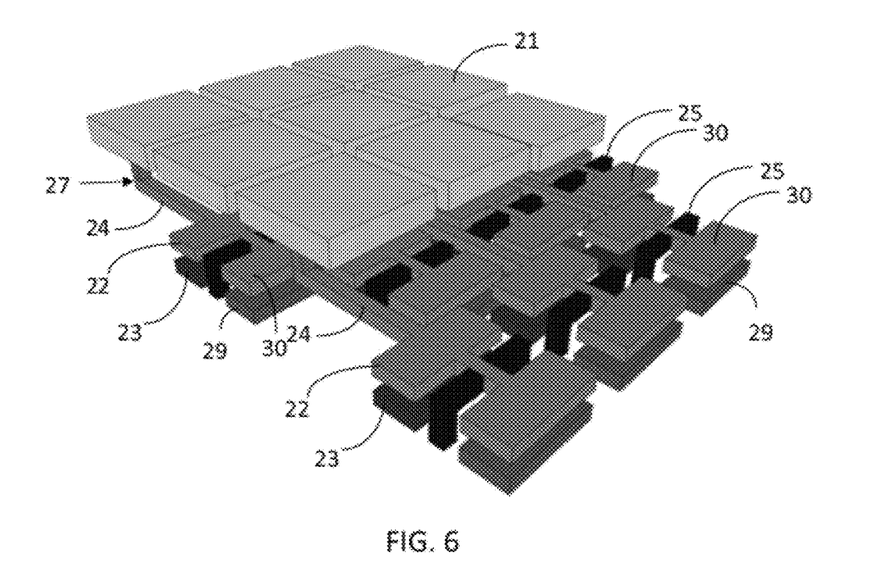
FIG. 6 is a schematic illustration of a 2D array of 3-terminal DND' with interleaved cantilevers according to one embodiment.
Figure 7:
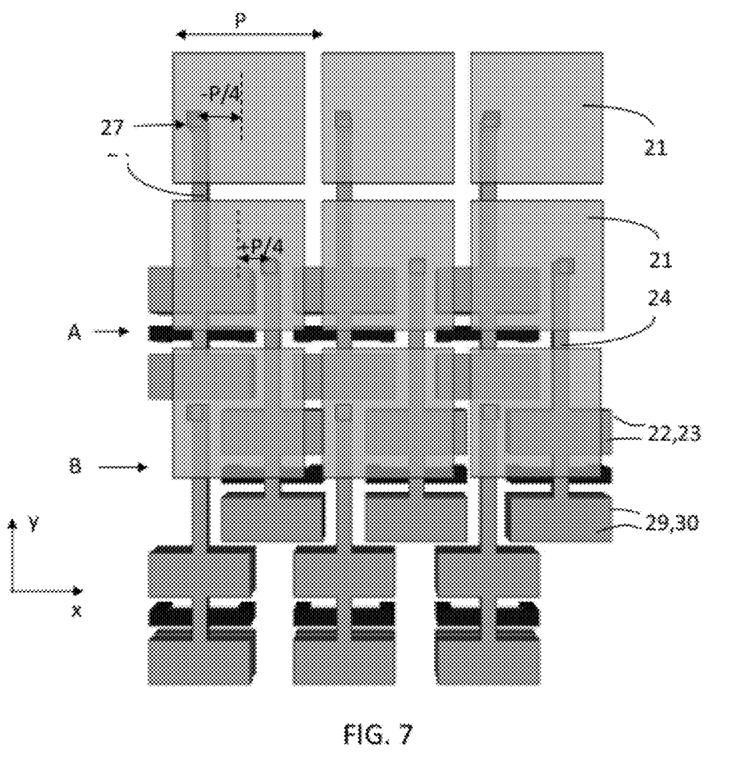
FIG. 7 is a semi-transparent top view of the array of FIG. 5, showing the interleaving of the DND actuators and their cantilevers with respect to the mirrors, to achieve correct 2D mirror alignment in accordance with one embodiment.

In an array as for example shown in 3D view in FIG. 6 and in top view in FIG. 7, where common top electrodes are provided for pull-down and pull-up movement, the common electrodes of a row of DND devices can be electrically connected and biased to a same voltage (not illustrated in the drawings). Hence the top electrodes of a row of DND devices may be common to all these DND devices on the row. The voltages applied to the pull-up and pull-down electrodes (bottom electrodes 23, 29) may be set individually for each DND in the row selected by the common voltage applied to the common electrodes 22, 30.

In the 3-terminal embodiment illustrated by FIG. 3, the top electrode consists of two electrode parts 22, 30 which are electrically connected to one another, thus forming a single common electrode, each electrode part 22, 30 facing one fixed electrode 23, 29, respectively. Both top electrode parts 22, 30 are electrically connected to be biased to a same voltage. Other configurations of the top electrode are possible to the extent they do not hinder the rotation of the cantilever 32 around the torsional elements 25. The top electrodes or electrode parts can also be attached to the bottom surface of the cantilever 32, i.e. at the surface of the cantilever 32 facing the supporting substrate. The top electrodes or electrode parts can also be attached to the top surface of the cantilever 32, i.e. at the surface of the cantilever 32 opposite the supporting substrate. The position of the top electrode or electrode parts on the cantilever 32 determines the distance between the top electrodes or parts 22, 30 and the fixed electrodes 23, 29 and hence influences the magnitude of the actuation voltages.

Use of DND devices 20 according to one embodiment can result in a reduction in the required driving voltage, compared to state-of-the-art electrostatic actuation scheme as illustrated for example in FIG. 1. This reduction in actuating voltage may be obtained thanks to the reduction in vertical displacement of the electrodes controlling the lift of the nano-mirror 21. The reduction in actuation voltage can be 15 fold as a consequence of a six-fold reduction in vertical displacement of the electrodes 22, optionally also 30.

The reduction in the relative vertical displacement z of the electrodes compared to the vertical displacement or lift of the nano-mirror 21 may be realized by making the distance d1 from the torsional element(s) 25 to the first longitudinal extremity 27 where the cantilever segment 24 of the cantilever 32 carries the mirror 21 larger than the distances d2, d3 from the at least one torsional element 25 to the respective extremities 40, 41 of the electrodes (d2: "pull-down" electrode, d3: "pull-up" electrode).

Figure 4:
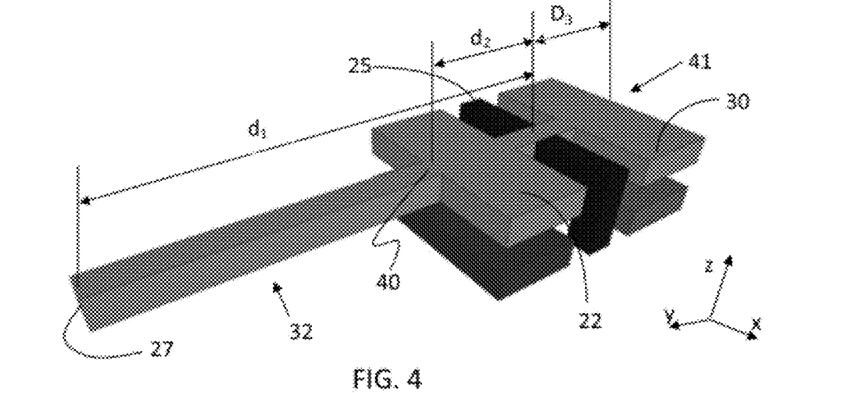
FIG. 4 shows a detailed view of the actuation mechanism with pull-down electrode, pull-up electrode and common electrode, and torsional elements, in accordance with one embodiment.

FIG. 4 illustrates the different distances. The reduction in vertical displacement is dependent on the ratio between both distances: d3/d1 and d2/d1. If the distance d1 between the mirror's position and the pivotal point is a particular number or times, e.g. three times, the distance d2 and/or d3, then the vertical displacement (in z-direction as illustrated in the drawings) of the nano-mirror 21 will be that same number of times, e.g. three times, the vertical displacement of the movable driving electrodes 22, 30. This vertical displacement of the nano-mirror 21 is proportional to the vertical distance z between the common electrode 22, 23 and the pull-up electrode 29 or pull-down electrode 23, respectively, whereby the ratio in distance determines the proportion factor.

3-Terminal Actuation

Whereas a first reduction in the actuation voltages is obtained by the difference in relative position of the nano-mirror 21 and the pull-up and pull-down electrodes 23, 29 with respect to the pivot point, a further two-fold reduction in vertical displacement is achieved by use of the 3-terminal actuation with active pull-down and pull-up functionality. As the cantilever 32 is rotating around the pivot formed by the at least one torsional element 25, which is located along the length of the cantilever 32 between the pull-up and pull-down electrodes 29, 23, the voltages applied on both pull-down and pull-up electrodes need to realize only one half of the required vertical mirror displacement (half up and half down). For example, if a total displacement or lift of about 150 nm at the end of the cantilever 32 requires only about 50 nm total displacement at the electrodes 23, 29, this may be achieved in one embodiment as about 25 nm upwards and about 25 nm downwards displacement. Applying voltage between the "pull-up" electrode 29 and the top electrode 30 results in an upwards displacement of about 25 nm, while applying a voltage between the "pull-down" electrode 23 and the top electrode 22 results in a downwards displacement of about 25 nm. This way, a six times smaller air-gap between every pair of terminals results in an almost 15-times lower pull-down, respectively pull-up voltage based on Eq. 1 above.

Figure 5:
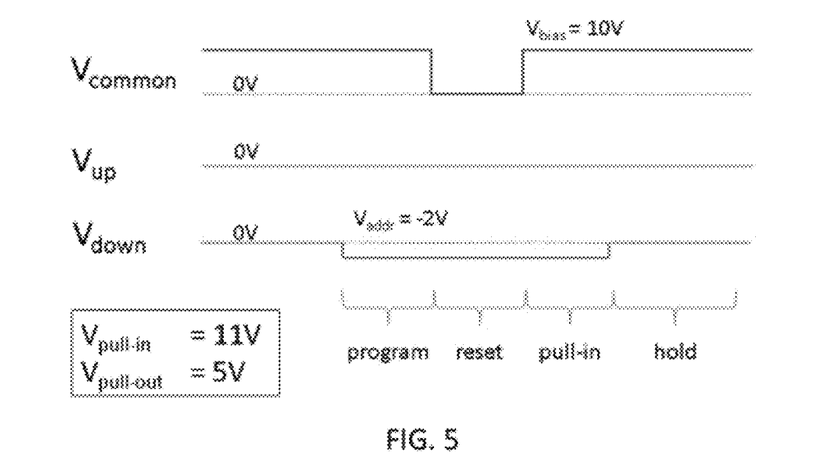
FIG. 5 illustrates a timing diagram for a 3-terminal DND actuation according to one embodiment.

A timing diagram for a 3-terminal actuation scheme is shown in FIG. 5, considering a "pull-in" voltage $V_{pull-in}$ in the range of about 11V and a "pull-out" voltage $V_{pull-out}$ of about 5V. The "pull-in" voltage $V_{pull-in}$ is the minimal voltage needed to bring two corresponding electrodes 22, 23 or 29, 30 together. The "pull-out" voltage is the voltage below which the two corresponding electrodes 22, 23 or 29, 30, previously attracted to one another so as to make contact, will separate.

A DND device 20 in one embodiment is provided with the nano-mirror 21 being held in one of both positions i.e. downward towards the substrate or upwards away from the substrate. The embodiment illustrated is for a three-terminal actuation, where the top electrodes of both electrode pairs 22, 23 and 29, 30 are electrically connected to one another so as to form a common top electrode. In the timing diagram of FIG. 5, the cantilever 32 is initially in a pull-up position, meaning the further movable top electrode 30 is near the further fixed pull-up electrode 29, and the nano-mirror 21 is away from the substrate. A high voltage $V_{common}$ is applied between the common top electrode 22, 30 and the pull-up electrode 29 in order to hold the cantilever in this position. In the example illustrated, the pull-up electrode 29 is biased to ground, $V_{up}$=0 V, while a voltage $V_{common}$ of about 10V is applied to the common electrode. Then a smaller negative voltage $V_{down}$ is applied to the pull-down electrode 23, whereafter the voltage $V_{common}$ applied to the common electrode 22, 30 is reduced, for example to 0V, in order to release the common electrode 22, 30 from the pull-up-electrode 29. The cantilever 32 is reset and can move to an intermediate position due to mechanical built-in forces of the torsional elements 25. In this example the pull-down electrode 23 is biased to about −2V while the common electrode 22, 30 is biased to ground. Once the cantilever 32 is in the intermediate position, the common electrode 22, 30 is biased to a high voltage, optionally the same high voltage as before, in order to create a voltage difference between the common electrode 22, 30 and a ground electrode sufficient to generate the pull-in voltage $V_{pull-in}$ for moving the common electrode 22, 30 towards the pull-down electrode 23. Once the cantilever 32 is in the pull-down position, the voltage difference between the common-electrode 22, 30 and the pull-down electrode 23 may be lowered to the voltage level needed to hold the cantilever 32 in this pull-down position. In the example illustrated, the common electrode 22, 30 remains biased to about 10V while the pull-down electrode 23 is biased to ground.

Interleaved Matrix

An advantage of the DND architecture according to one embodiment is that it allows a close packing of the DND devices 20 in an 2D array. An example of such array is shown in FIG. 6 and FIG. 7, showing an example array of 3×3 DNDs. In actual implementations, of course, the array may comprise many more DNDs.

While the reflective mirrors 21 are perfectly aligned in a closely packed 2D array in a plane above the plane of the cantilevers 32, in one embodiment the underlying electrodes 23, 29 for actuating the mirrors 21 may be interleaved with each other as their cantilevers 32 are extending into and stretching in-between the electrodes 22, 23, 29, 30 from a neighboring row. In one row, for example indicated with A in FIG. 7, one will have an alternating sequence of cantilevers 32, each supporting a mirror 21 under control of the electrodes 22, 23 and 29, 30 in the foregoing row, indicated with B in FIG. 7, and of electrode pairs 22, 23 and 29, 30 controlling the rotation of the mirror 21 in the next row.

Correct alignment of the mirrors 21 in the regular 2D array is a strong application requirement of a holographic projection system. This 2D alignment can be retained in the disclosed DND system architecture according to one embodiment by correct offsetting of the mirror "foots", i.e. these points where the mirrors 21 are connected to their cantilevers 32, in even and odd DND rows as shown in FIG. 6 and FIG. 7. In this example, an offset of for example about −P/4 is required in all odd rows, while an offset of for example about +P/4 is required in all even rows, where P is the mirror pitch. In this example the movable electrodes, e.g. common electrodes, have the same width in the x-direction as the mirrors.

In this interleaved 2D array of DND devices a row will comprise in one plane near the substrate the actuation mechanisms, i.e. the common electrodes 22, 30 and the pull-up/pull-down electrodes 29, 23 and in a higher plane the nano-mirrors 21 wherein in one embodiment these nano-mirrors 21 are not actuated by electrodes possibly physically located underneath other nano-mirrors 21.

Cantilever Architecture with Flexure Element

In one embodiment, adding a flexure element 80 (FIG. 8) to the cantilever design brings a further increase in diffractive optical efficiency of the 2D array of DND devices. The functioning of such an DND array can be simply compared to the behavior of blazed gratings, where most of the optical energy is diffracted into one of the two otherwise symmetrical diffraction orders (e.g. "+1" diffraction order), while the other complementary diffractive order is attenuated (e.g. "−1" diffractive order), as shown in the top part of FIG. 9. This macroscopic effect may be achieved at the microscopic level, as illustrated in the bottom part of FIG. 9, by a flexure element 80 inserted in the cantilever 32.

Figure 8:
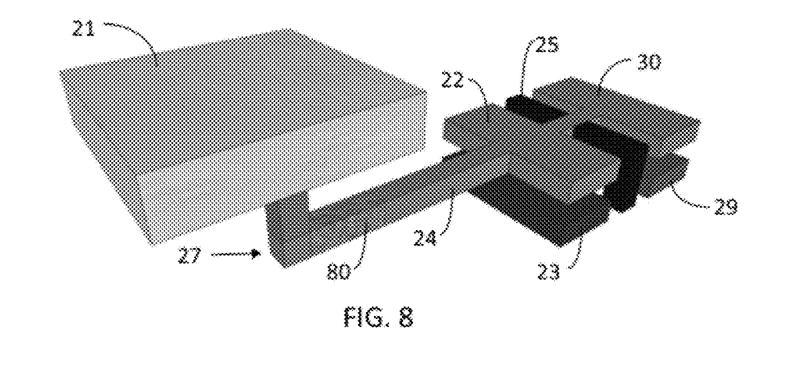
FIG. 8 is a detailed schematic view of a cantilever with flexure element according to one embodiment.

This flexure element 80 may function as a hinge, allowing parts of the cantilever 32 to pivot relative to one another.

Figure 9:
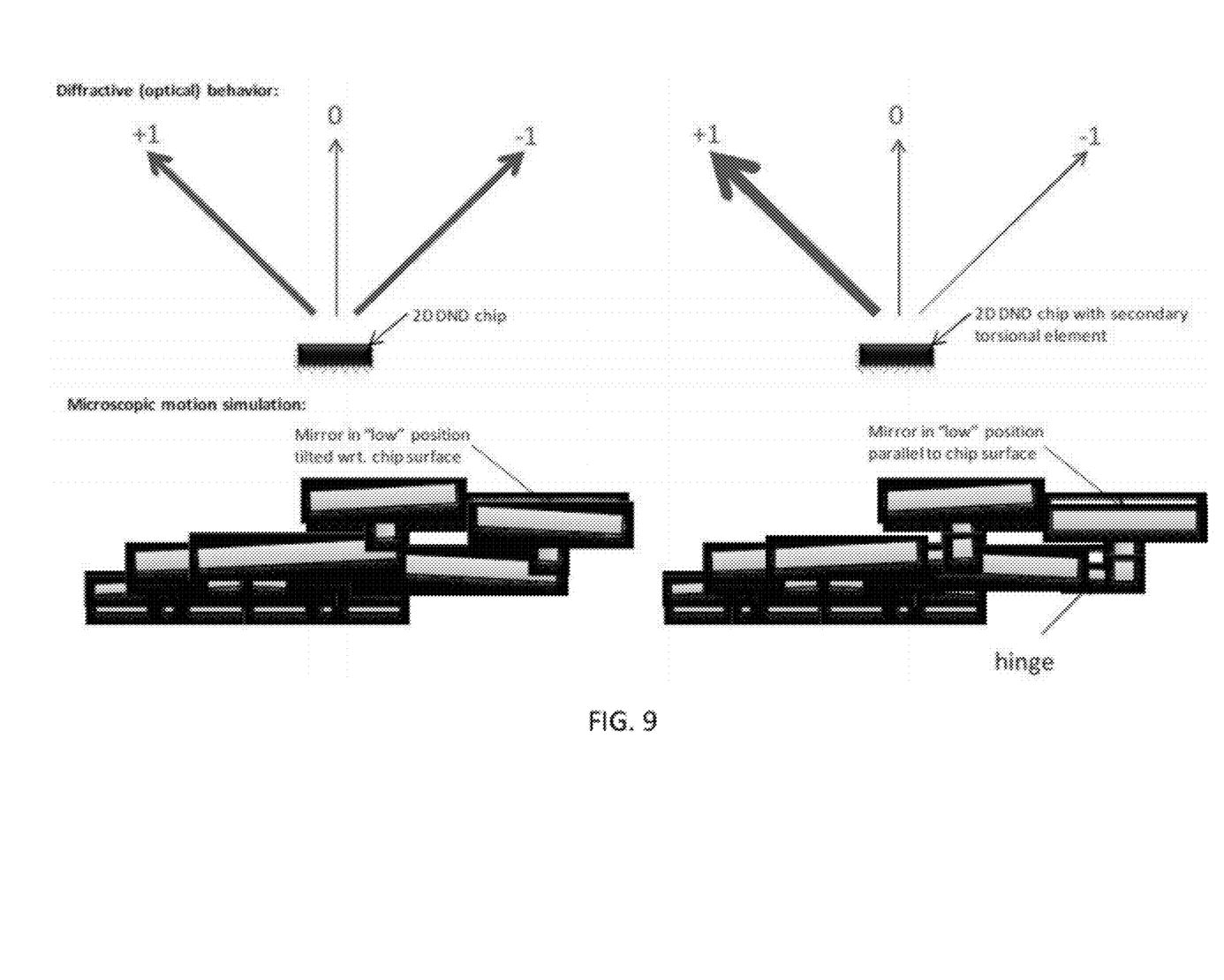
FIG. 9 illustrates a comparison of a 2D DND device in accordance with one embodiment whereby the left hand side of FIG. 9 illustrates a 2D DND device as illustrated by FIG. 2 and FIG. 3, and whereby the right hand side of FIG. 9 illustrates such 2D DND device including a flexure element or "hinge". A change in macroscopic diffractive behavior is shown, more specifically a change in dominant +1 diffraction order (illustrated at the top of the drawing), achieved by a microscopic change in mirror functionality, more specifically a mirror counter rotation to horizontal position due to the flexure element (illustrated at the bottom of the drawing).

In the mirror's "low" position the mirror 21 will counter-rotate such that the mirror upper surface moves into a substantially horizontal, e.g. perfectly horizontal position. When the cantilever 32 rotates towards the supporting substrate under influence of the electrical field created between the movable top electrode 22 and the pull-down electrode 23, that part of the cantilever 32 supporting the mirror 21 will become parallel with the supporting substrate. Thus, in a regular grating simulation, the "+1"/"−1" diffraction symmetry is broken, as the mirrors in their "high" positions "send" more diffracted light into the "+1" diffractive order. This in practice means that in such a DND-based holographic video system, the "+1" order carries most of the light and so is used for projecting 3D images, while the ghost "−1" diffraction order becomes practically non-existent or at least negligible.

This hinge can be integrated in the cantilever, e.g. by forming part of the cantilever near the mirror in a material that is less stiff than the material of the cantilever itself.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments, but only to the claims.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A digital nano-mirror device (DND) comprising:
a nano-mirror; and
an actuating module configured to move the nano-mirror in an upward and/or downward position,
wherein the actuating module comprises a cantilever mounted to a fixed structure, wherein the cantilever comprises:
a first cantilever segment extending in a first direction, the first cantilever segment having a first end connected to the nano-mirror and a second end connected to a second cantilever segment;
a third cantilever segment extending in the first direction, the third cantilever segment having a first end connected to the second cantilever segment and a second end connected to a fourth cantilever segment,
wherein the third cantilever segment is pivotally mounted to the fixed structure at a pivot location such that the second cantilever segment is disposed on a first side of the pivot location and the fourth cantilever segment is disposed on a second side of the pivot location;
a first electrode configured to actuate the second cantilever segment and substantially overlapping the second cantilever segment on the first side when viewed in a direction perpendicular to a surface of the nano-mirror; and
a second electrode configured to actuate the fourth cantilever segment and substantially overlapping the fourth cantilever segment on the second side when viewed in the direction perpendicular to the surface of the nano-mirror.

2. The DND device of claim 1, wherein the surface area of the second cantilever segment is larger than the surface area of the first cantilever segment.

3. The DND device of claim 1, wherein the surface area of the second cantilever segment substantially corresponds to the surface area of the at least one first electrode.

4. The DND device of claim 1, wherein the first cantilever segment comprises a flexure element which allows bending of the first cantilever segment so as to put the nano-mirror in a horizontal position when being actuated downwards.

5. The DND device of claim 1, wherein the at least one first electrode is physically located outside the mirror area.

6. An imaging system comprising a plurality of the DND devices of claim 1 arranged as to form an array of nano-mirrors.

7. The DND device of claim 1, wherein the second and fourth cantilever segments comprise electrodes.

8. The DND device of claim 7, wherein the electrodes are electrically connected to each another.

9. A method of manufacturing a diffractive nano-electro-mechanical device (DND) device, the method comprising:
forming a nano-mirror; and
forming an actuating module configured to move the nano-mirror in an upward and/or downward position,
wherein forming the actuating module comprises forming a cantilever mounted to a fixed structure, wherein forming the cantilever comprises:
forming a first cantilever segment extending in a first direction, the first cantilever segment having a first end connected to the nano-mirror and a second end connected to a second cantilever segment;
forming a third cantilever segment extending in the first direction, the third cantilever segment having a first end connected to the second cantilever segment and a second end connected to a fourth cantilever segment,
wherein the third cantilever segment is pivotally mounted to the fixed structure at a pivot location such that the second cantilever segment is disposed on a first side of the pivot location and the fourth cantilever segment is disposed on a second side of the pivot location;
a first electrode configured to actuate the second cantilever segment and substantially overlapping the second cantilever segment on the firsts side when viewed in a direction perpendicular to a surface of the nano-mirror; and
a second electrode configured to actuate the fourth cantilever segment and substantially overlapping the fourth cantilever segment on the second side when viewed in the direction perpendicular to the surface of the nano-mirror.

10. The method of claim 9, wherein the surface area of the second cantilever segment is larger than the surface area of the first cantilever segment.

11. The method of claim 9, wherein the surface area of the second cantilever segment substantially corresponds to the surface area of the at least one first electrode.

12. The method of claim 9, wherein the first cantilever segment comprises a flexure element which allows bending of the first cantilever segment so as to put the nano-mirror in a horizontal position when being actuated downwards.

13. The method of claim 9, wherein the at least one first electrode is physically located outside the mirror area.

14. A diffractive nano-electro-mechanical device (DND) device comprising:
a nano-mirror; and
means for moving the nano-mirror in an upward and/or downward position, wherein the moving means comprises a cantilever mounted to a fixed structure, wherein the cantilever comprises:
a first cantilever segment extending in a first direction, the first cantilever segment having a first end connected to the nano-mirror and a second end connected to a second cantilever segment;
a third cantilever segment extending in the first direction, the third cantilever segment having a first end connected to the second cantilever segment and a second end connected to a fourth cantilever segment,
wherein the third cantilever segment is pivotally mounted to the fixed structure at a pivot location such that the second cantilever segment is disposed on a first side of the pivot location and the fourth cantilever segment is disposed on a second side of the pivot location;
a first electrode actuating means configured to actuate the second cantilever segment and substantially overlapping the second cantilever segment on the first side when viewed in a direction perpendicular to a surface of the nano-mirror; and
a second actuating means configured to actuate the fourth cantilever segment and substantially overlapping the fourth cantilever segment on the second side when viewed in the direction perpendicular to the surface of the nano-mirror.

15. The DND device of claim 14, wherein the first actuating means comprises a first electrode configured to actuate the second cantilever segment and wherein the second actuating means comprises a second electrode configured to actuate the fourth cantilever segment.

* * * * *

UNITED STATES PATENT AND TRADEMARK OFFICE
CERTIFICATE OF CORRECTION

PATENT NO. : 8,643,937 B2  
APPLICATION NO. : 13/297170  
DATED : February 4, 2014  
INVENTOR(S) : Haspeslagh et al.

Page 1 of 1

It is certified that error appears in the above-identified patent and that said Letters Patent is hereby corrected as shown below:

In the Claims

In column 16 at line 17, In Claim 9, change "firsts" to --first--.

In column 16 at line 58, In Claim 14, after "first" delete "electrode".

Signed and Sealed this
Nineteenth Day of August, 2014

Michelle K. Lee
*Deputy Director of the United States Patent and Trademark Office*